(12) United States Patent
Mohtasham et al.

(10) Patent No.: US 7,712,193 B2
(45) Date of Patent: May 11, 2010

(54) ROPE TENSIONER

(75) Inventors: Medi Mohtasham, Manchester (GB); Hamed Faridfar, Lancashire (GB)

(73) Assignee: Idem Safety Switches Limited, Leigh (GB)

( * ) Notice: Subject to any disclaimer, the term of this patent is extended or adjusted under 35 U.S.C. 154(b) by 846 days.

(21) Appl. No.: 11/454,528

(22) Filed: Jun. 16, 2006

(65) Prior Publication Data

US 2006/0282990 A1 Dec. 21, 2006

(30) Foreign Application Priority Data

Jun. 18, 2005 (GB) .................... 0512612.3

(51) Int. Cl.
*F16G 11/00* (2006.01)
(52) U.S. Cl. .................................. 24/136 R
(58) Field of Classification Search ............. 24/115 G, 24/115 H, 115 M, 136 B, 136 R
See application file for complete search history.

(56) References Cited

U.S. PATENT DOCUMENTS

| 1,141,977 | A | * | 6/1915 | Rogers | 24/136 R |
| 1,256,824 | A | * | 2/1918 | Olson | 24/136 B |
| 1,388,045 | A | * | 8/1921 | Johnson | 24/136 R |
| 2,173,698 | A | * | 9/1939 | Schenik | 24/136 B |
| 2,524,649 | A | * | 10/1950 | Buhler | 24/115 G |
| 5,315,741 | A | * | 5/1994 | Dubberke | 24/115 G |
| 5,365,641 | A | * | 11/1994 | Watanabe et al. | 24/115 G |
| 5,653,711 | A | * | 8/1997 | Hayano et al. | 606/74 |
| 6,178,606 | B1 | * | 1/2001 | Glendon | 24/712.5 |
| 2002/0029439 | A1 | * | 3/2002 | Lobler | 24/136 R |
| 2004/0034973 | A1 | * | 2/2004 | Lobler | 24/136 R |
| 2006/0085956 | A1 | * | 4/2006 | Stevens | 24/300 |

* cited by examiner

*Primary Examiner*—Robert J Sandy
(74) *Attorney, Agent, or Firm*—Quarles & Brady LLP; Gavin J. Milczarek-Desai

(57) ABSTRACT

A rope tensioner is used, for example, to connect a rope 1 under tension to a safety switch whereby the switch operates, e.g., to turn off power to machinery guarded or bounded by the rope in the event that the rope tension departs significantly from a predetermined value. The rope tensioner ensures a firm gripping of the rope 1 reducing risk of the rope 1 slipping and losing the required tension. The rope tensioner comprises to this end a housing 2 with passageways 16,17 to receive the rope 1 running between main inlet and outlet locations and a clamp 14 to apply a clamping force transverse to the rope 1 at a clamping location 8 within the passageway 16, 17, the passageway having sections running in opposed directions.

16 Claims, 3 Drawing Sheets

ROPE TENSIONER

RELATED APPLICATIONS

This application claims foreign priority of U.K. Patent Application No. GB 0512612.3, filed Jun. 18, 2005.

BACKGROUND OF THE INVENTION

This invention relates to a gripping device for attachment to an elongate flexible member such as a safety rope.

Protective safety rope systems for machinery use ropes which are linked in tension to switch mechanism whereby a significant change in tensioning of a rope causes the associated switch mechanism to operate to cut off power supply to the machinery.

The rope is linked to the switch mechanism via a gripping device which holds the rope and has a hook which engages an eye of the switch mechanism. Known gripping devices have jaws between which a length of the rope is clamped. However, with such known devices it has been found difficult to prevent the rope slipping and losing tension.

This is particularly the case with ropes constructed with a central core and an outer sleeve since the sleeve can pull away from the core under tension.

An object of the present invention is to provide a convenient to use gripping device with which an elongate flexible member such as a rope can be held with improved security so as to prevent or at least appreciably reduce risk of slipping under tension.

According to the invention therefore there is provided a gripping device for gripping an elongate flexible member, said device comprising a housing with a passageway to receive the member running between main inlet and outlet locations, and a clamp mechanism operable to apply a transverse clamping force to the member at a clamping location of said passageway, the passageway having sections running in opposed directions.

With this arrangement gripping of the member can be achieved in a convenient manner simply by inserting the member through the passageway from the inlet to the outlet locations and then operating the clamp mechanism to clamp the member, and this can result in particularly secure gripping of the member in so far as it passes in a first direction and then loops back on itself to pass in a second, opposed direction through the, or a second said passageway section. Preferably there are two passageway sections although if desired there may be three or more sections whereby the elongate member can be passed through the sections to run in successive opposed directions.

The passageway sections may be wholly separate whereby the elongate member extends beyond the housing between such sections through auxiliary inlet and outlet locations. Thus the sections may be defined by through bores each extending wholly through the housing. Alternatively, if desired, the sections may be linked within the housing.

The sections may be of any form and may be arranged in any disposition relative to each other. In one embodiment the sections are straight and may run parallel to each other whereby the elongate member loops back through 180E between successive said sections.

The main inlet and outlet locations may comprise openings in the housing. If desired one or both such locations may additionally incorporate a guide structure to guide passage of the elongate member into or out of the respective passageway section. Conveniently one such guide structure may be provided comprising a frame projecting from the housing and having an opening to receive the elongate member spaced from the housing. Where the passageway sections are wholly separate and auxiliary inlet and outlet locations are provided as aforesaid these may also comprise openings.

The housing may be of any suitable form. In one embodiment the housing comprises a side wall structure bounding an internal cavity closed by opposite end walls.

One or both end walls may be provided with the aforesaid openings defining the main inlet and outlet locations, and the auxiliary such locations where provided, and the cavity may link the openings to define the passageway sections.

The side wall structure may be cylindrical whereby the end walls may be circular. One such end wall may be integral whereby the opposite end wall may be removably attached to the side wall structure e.g. by screws or the like.

The clamp mechanism may be located within the housing e.g. within the aforesaid cavity and may comprise a clamp member having at least one abutment surface movable relative to a respective fixed surface of the housing in at least one said passageway section thereby to trap the elongate member between such surfaces.

In one embodiment the member has a plurality of abutment surfaces movable relative to a plurality of said fixed abutment surfaces in the respective passageway sections.

In the case where the main inlet and outlet locations, and any auxiliary such locations, are openings as aforesaid, these fixed abutment surfaces may be edges of the openings whereby the clamp member abutment surfaces are movable transversely across the openings to trap the elongate member between the opening edges and the clamp member abutment surfaces.

Conveniently the clamp member may comprise a bar which has one end region slidably located within an opening in the side wall of the housing. An adjustment device may be provided for affecting sliding movement of the bar between clamp and release positions. This adjustment device may comprise a bolt held captive in the side wall of the housing and which engages a threaded bore at the end of the bar opposite to the aforesaid end region whereby movement of the bar is effected by rotation of the bolt.

The housing may be provided with an adjustable link structure for attachment of the housing to a switch member. This link structure may comprise a rod projecting from the housing which is joined to a hook via a screw mechanism of adjustable length.

BRIEF DESCRIPTION OF THE DRAWINGS

The invention will now be described further by way of example only and with reference to the accompanying drawings in which:—

DETAILED DESCRIPTION OF THE DRAWINGS

Figure 1:
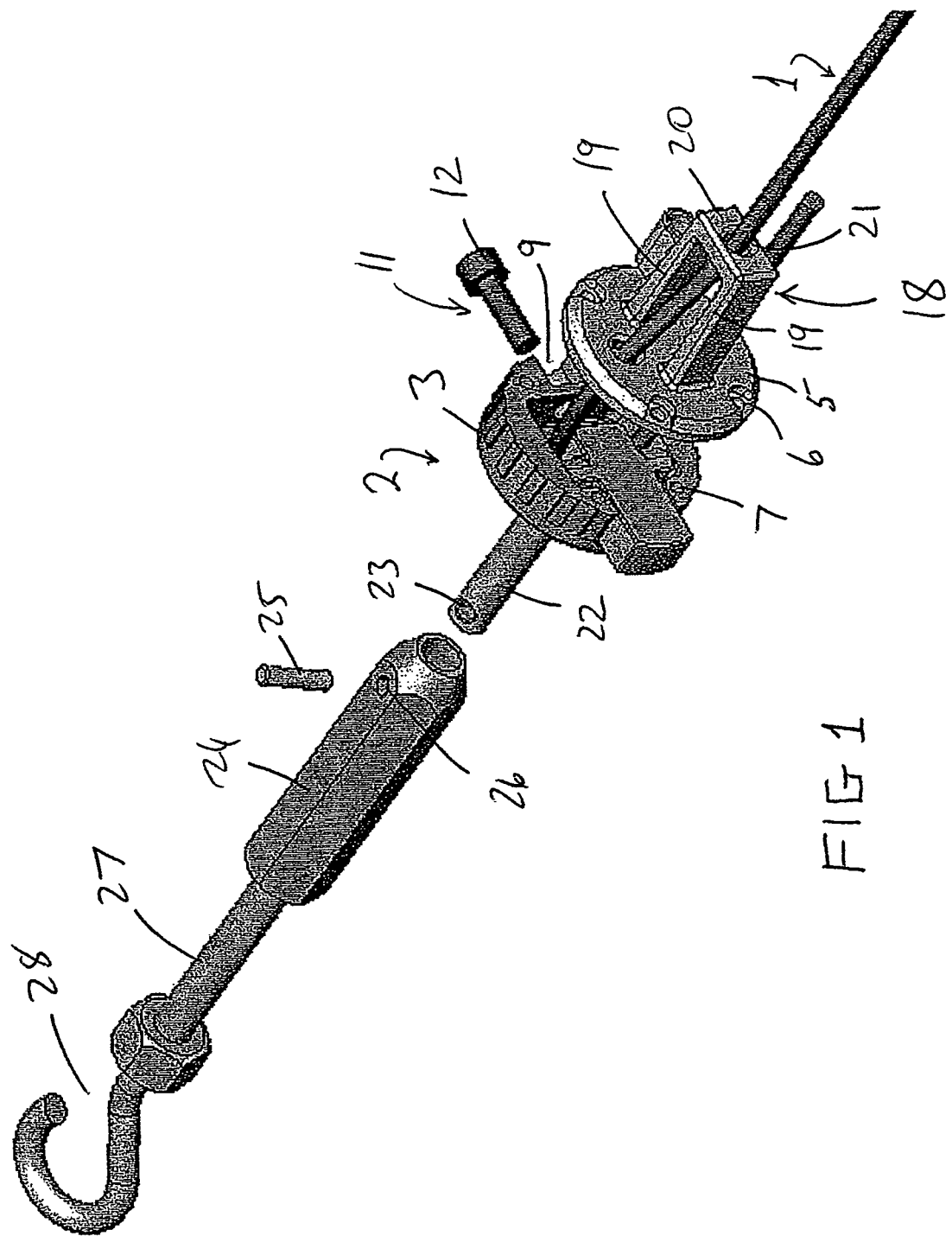
FIG. 1 is an exploded perspective view of one form of a gripping device according to the present invention.
Figure 2:
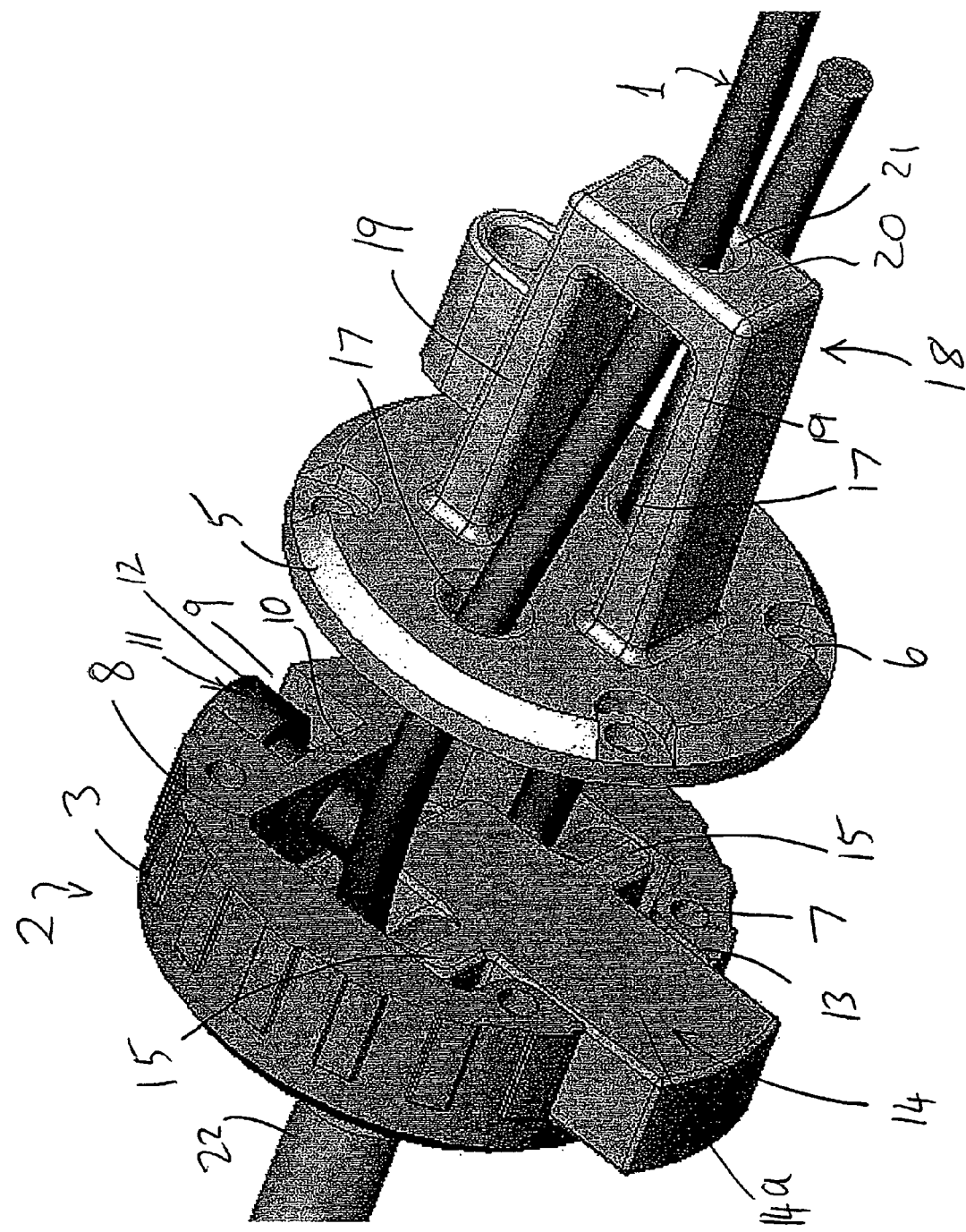
FIG. 2 is an enlarged partially exploded perspective view showing parts of the device of FIG. 1.
Figure 3:
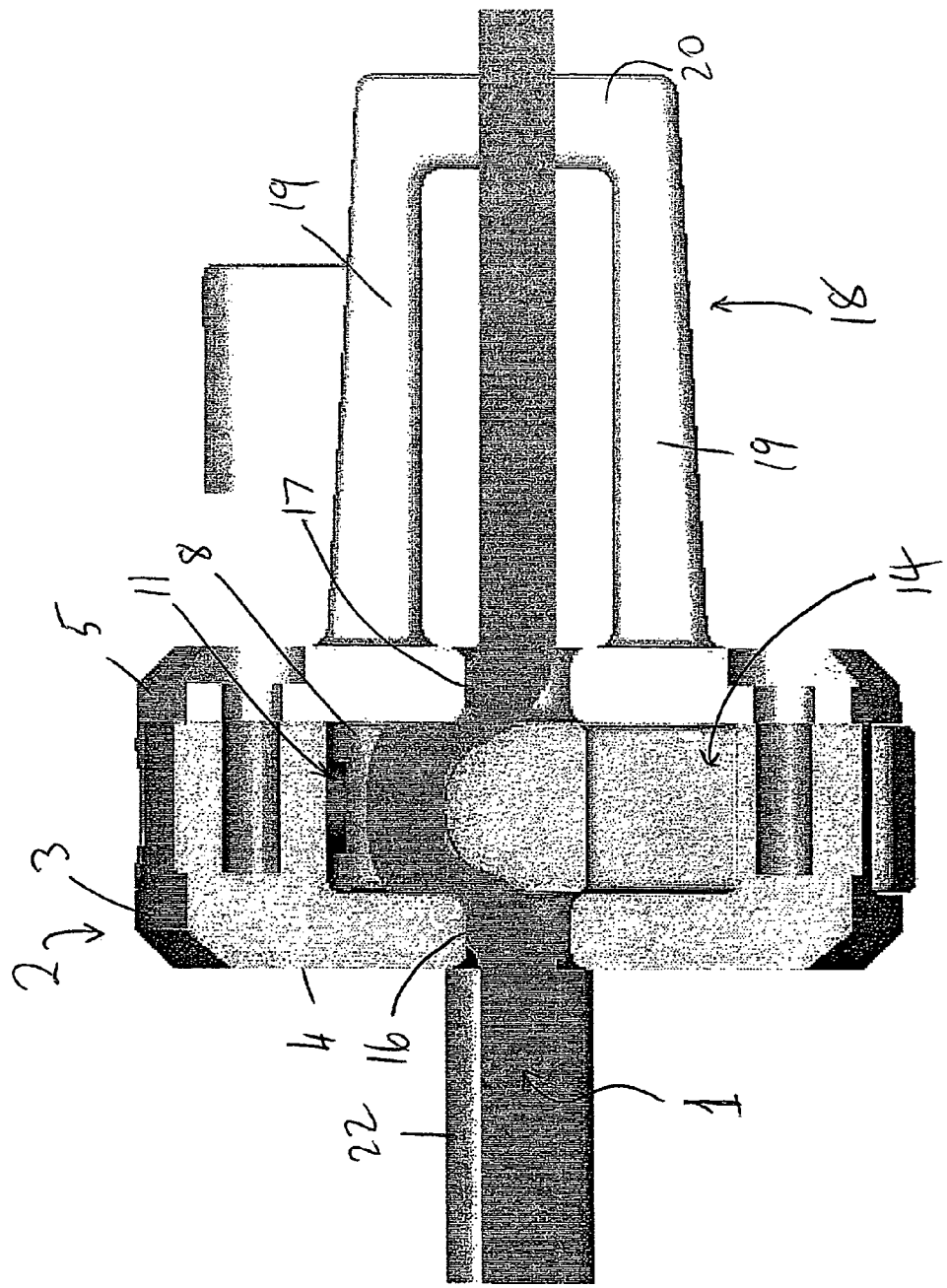
FIG. 3 is a sectional view of the assembled parts of FIG. 2.

Referring to the drawings, a gripping device for attachment to a rope 1 has a metal housing 2 with a cylindrical side wall 3 closed at one end by an integral circular end wall 4 and being closeable at its opposite end by a further circular end wall 5 which is removably attached to the side wall 3 by spaced screws which are passed through holes 6 spaced around the periphery of the end wall 5 and engage threaded bores 7 in thickened internal parts of the side wall 3.

The housing 2 encloses a shaped internal cavity 8 and is shallow i.e. the axial length of the side wall 3 is a minor proportion of its external diameter.

A recess 9 is formed at one position in the periphery of the side wall 3 and this is closed by an internal transverse web 10 having a central radially extending through bore. A bolt 11 passes freely through the bore and has a head 12 within the recess 10.

The side wall 3 has a through opening 13 at a position diametrically opposite to the recess 9. An elongate generally rectangular bar 14 fits within the cavity 8 of the housing 2 and projects through the opening 13.

The bar 14 has a main rectangular body part 14a with generally flat top, bottom and side faces and a flat end face internally of the housing. The opposite end face of the body part 14a is curved in like manner to the curvature of the housing side wall. The width of the body part 14a, i.e. its transverse dimension between its side walls, is substantially less than the corresponding width of the cavity 8 so that appreciably there are spaces of the cavity alongside the side walls of the body part 14a.

The cross-sectional profile of the body part 14a is generally the same as that of the opening 13 whereby the bar is a sliding fit within the opening 13. The dimensions of the opening 13 and the bar in the axial direction of the housing are generally the same as the side wall 3 whereby the top and bottom faces of the body part 14a of the bar 14 are a sliding fit with the internal faces of the end walls 4, 5.

The bar 14 is aligned with the bolt 11 and has at its end facing the bolt 11 a threaded bore to receive the bolt 11.

The bar 14 has two, like, mutually aligned transverse projections 15 which project from the side faces of the body part 14a and have convexly curved leading faces i.e. those faces which are directed towards the web 10. The extensions 15 extend up to and make a sliding fit within the inner surfaces of the side wall 3 bounding the cavity 8.

The bar 14 can slide between an outward position at which trailing flat faces of the extensions 15 engage surfaces of abutments 13a of the housing 2 bounding the opening 13 and the leading flat end face of the bar body part 14a is spaced away from the web 10, and a forward position at which this end face abuts the web 10. Movement of the bar 14 between these positions is effected by rotation of the bolt 11.

Each of the two end walls 4, 5 has a respective pair of holes 16, 17 therethrough. The holes 16 of one pair are respectively aligned with the holes 17 of the other pair and the holes 16, 17 of each pair are symmetrically disposed about the central axis of the housing 2.

The holes 16 in the integral end wall 4 are disposed generally midway between the abutments 13a and the web 10 aligned at right angles to the longitudinal axis of the bar 14 one on each side of the body part 14a of the bar 14, in the region of the aforesaid spaces of the cavity 8 alongside the body part 14a.

Thus, when the bar 14 is at its outward position all holes 16, 17 in the two end walls 4, 5 are freely exposed.

The external surface of the removable end wall 5 has fixed thereto a U-shaped frame member 18. The free ends of legs 19 of the member 18 are fixed to the external surface of the end wall 5 so that the member 18 projects perpendicularly away from the end wall 5 with the legs 19 symmetrically disposed with regard to the central axis of the housing 2 and aligned with each other perpendicularly to the alignment of the holes 17 in the end wall 5.

The legs 19 of the member 18 are straight and are linked by a cross piece 20 extending at right angles thereto. A circular opening 21 extends through this cross piece 20 axially aligned with the central axis of the housing 2.

The integral end wall 4 of the housing 2 has a central opening and a straight rod 22 has one end passed through this opening and held captive axially relative to the end wall 4 e.g. by virtue of an enlargement on the rod 22 internally of the housing 2. The rod 22 is free to rotate about its axis relative to the end wall 4.

The rod 22 extends externally axially of the housing 2 and has at its free end remote from the housing 2 a transverse bore 23. One end of an adjustment thimble or sleeve 24 is fixed around the end of the rod 22 by means of a transverse pin 25 passed through a bore 26 in the sleeve 24 and the bore 23 in the rod 22. The sleeve 24 is internally threaded and engages at its opposite end a threaded bolt 27 which terminates in a hook 28. The sleeve 24 and the rod 22 can be rotated relative to the housing 2 and the bolt 27 to vary the separation of the hook 28 and the end wall 4 of the housing 2.

The gripping device is used to connect a rope 1 under tension to a safety switch (not shown) whereby the switch operates e.g. to turn off power to machinery guarded or bounded by the rope 1 in the event that the rope tension departs significantly from a predetermined magnitude.

The hook 28 is linked to an operating member of the switch by engagement with an eyebolt, and an end portion 1a of the rope 1 is gripped within the housing 2.

Gripping of the rope end portion 1a is achieved by inserting such end portion 1a through the hole 21 in the cross piece 20 of the U-shaped member 18, then through one of the holes 17 in the removable end wall 5 and from there through the aligned hole 16 in the integral end wall 4. The emerging end portion 1a of the rope 1 is then looped back and inserted through the other pair of aligned holes 16, 17 so as the emerge externally of the removable end wall 5.

The exposed bolt head 12 is now rotated to cause the bar 14 to move towards the web 10. This causes the side extensions 15 of the bar 14 to move to positions at which they partially overlap the holes 16, 17. Thereby the curved leading surfaces of the extensions 15 engage the rope 1 and clamp this between the edges of the holes 16, 17 and the curved faces of the extension 15.

The rope 1 thereby extends through the hole 21 in the U-shaped member 18 which acts as a guide, and then through the housing 2 between the two pairs of aligned holes 16, 17 which define two passageway sections for the rope 1 which run in opposed directions parallel to the central axis of the housing 2, with the rope being looped externally of the integral end wall 4 freely or in close contact therewith. This convoluted passage of the rope involving looping back through 180° in conjunction with the rigid locking or clamping action of the bar applied to both passageway sections, i.e. to both runs of the rope, ensures firm gripping of the rope with no, or little, risk of slipping under tension.

Adjustment of the tensioning of the rope 1 to achieve a desired magnitude is achieved by pulling the rope through to a desired extent and then rotating the sleeve 24 for fine adjustment purposes.

It is of course to be understood that the invention is not intended to be restricted to the details of the above embodiment which are described by way of example only.

The invention claimed is:

1. A gripping device for gripping an elongate flexible member, said device comprising a housing including a side wall structure bounding an internal cavity closed by opposite end walls, wherein both end walls are provided with openings defining a pair of main inlet and outlet locations and the cavity links the openings to define a passageway, the passageway having sections running in opposed directions to receive the member running between main inlet and outlet locations in a looping back arrangement within the cavity, and a clamp mechanism operable to apply a transverse clamping force to the member at a clamping location of said passageway, wherein the clamp mechanism is located within the housing and comprises a clamp member having a bar which has one end region slidably located within an opening in the side wall of the housing, said bar including at least one abutment surface movable relative to a respective fixed surface of the housing in at least one said passageway section thereby to trap the elongate member between such surfaces.

2. A gripping device according to claim 1, wherein the passageway sections are wholly separate whereby the elongate member extends beyond the housing between such sections through auxiliary inlet and outlet locations.

3. A gripping device according to claim 2, wherein the auxiliary inlet and outlet locations comprise openings in the housing.

4. A gripping device according to claim 1, wherein an adjustment device is provided for affecting sliding movement of the clamp bar between clamp and release positions.

5. A gripping device according to claim 4, wherein the adjustment device comprises a bolt held captive in the ei-a side wall of the housing and which engages a treaded bore at the end of the clamp bar opposite to the aforesaid end region whereby movement of the bar is effected by rotation of the bolt.

6. A gripping device according to claim 1, wherein the passageway sections are linked within the housing.

7. A gripping device according to claim 1, wherein the passageway sections are straight and run parallel to each other whereby the elongate member loops back through 180° between successive said sections.

8. A gripping device according to claim 1, wherein the main inlet and outlet locations may comprise openings in the housing.

9. A gripping device according to claim 8, wherein one or both such locations additionally incorporate a guide structure to guide passage of the elongate member into or out of the respective passageway section.

10. A gripping structure according to claim 9, wherein one such guide structure is provided comprising a frame projecting from the housing and having an opening to receive the elongate member spaced from the housing.

11. A gripping structure according to claim 1, wherein the side wall structure is cylindrical whereby the end walls are circular.

12. A gripping structure according to claim 1, wherein one such end wall is integral whereby the opposite end wall is removably attached to the side wall structure.

13. A gripping member according to claim 1, wherein the clamp member has a plurality of abutment surfaces movable relative to a plurality of said fixed abutment surfaces in the respective passageway sections.

14. A gripping member according to claim 13, wherein in the case where the main inlet and outlet locations are openings as aforesaid, these fixed abutment surfaces may be edges of the openings whereby the clamp member abutment surfaces are movable transversely across the openings to trap the elongate member between the opening edges and the clamp member abutment surfaces.

15. A gripping device according to claim 1, wherein the housing is provided with an adjustable link structure for attachment of the housing to a switch member.

16. A gripping device according to claim 15, wherein the link structure comprises a rod projecting from the housing which is joined to a hook via a screw mechanism of adjustable length.

* * * * *

UNITED STATES PATENT AND TRADEMARK OFFICE
CERTIFICATE OF CORRECTION

PATENT NO. : 7,712,193 B2  Page 1 of 1
APPLICATION NO. : 11/454528
DATED : May 11, 2010
INVENTOR(S) : Medi Mohtasham and Hamed Faridfar It is certified that error appears in the above-identified patent and that said Letters Patent is hereby corrected as shown below:

Column 5, Claim 5, line 2, delete "ei-a".

Signed and Sealed this

Twenty-ninth Day of June, 2010

David J. Kappos
*Director of the United States Patent and Trademark Office*

UNITED STATES PATENT AND TRADEMARK OFFICE
CERTIFICATE OF CORRECTION

PATENT NO. : 7,712,193 B2
APPLICATION NO. : 11/454528
DATED : May 11, 2010
INVENTOR(S) : Medi Mohtasham and Hamed Faridfar It is certified that error appears in the above-identified patent and that said Letters Patent is hereby corrected as shown below:

Column 5, line 26 (Claim 5, line 2) delete "ei-a".

This certificate supersedes the Certificate of Correction issued June 29, 2010.

Signed and Sealed this

Twentieth Day of July, 2010

David J. Kappos
*Director of the United States Patent and Trademark Office*